United States Patent Office 2,963,399
Patented Dec. 6, 1960

2,963,399

FUNGICIDAL POLYCHLOROBENZOPHENONE OXIMES

Henry Bluestone, Cleveland Heights, Ohio, assignor to Diamond Alkali Company, Cleveland, Ohio, a corporation of Delaware No Drawing. Filed June 29, 1954, Ser. No. 440,267

7 Claims. (Cl. 167—30)

This invention relates to new chemical compounds, compositions containing such compounds, and to methods for their use.

The present invention is directed to halogenated benzophenone oximes represented by the formula

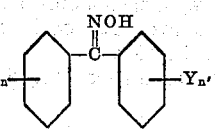

wherein X and Y are halogen atoms, and $n$ and $n'$ represent numbers within the range of 2 to 5, inclusive.

Generally, preferred compounds of the above type have the formula

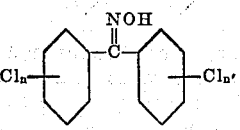

wherein $n$ and $n'$ represent numbers within the range of 2 to 5, inclusive.

Illustrative of specific compounds of the above type are 2,5,2',5'-tetrachlorobenzophenone oxime, 2,3,5,6,2', 3',5',6'-octachlorobenzophenone oxime, and 2,4,5,2',4',5'-hexachlorobenzophenone oxime.

Illustrative of their usefulness, compounds of this invention have been found to exhibit singular effectiveness as fungicides, particularly in plant applications, since the compounds are not phytotoxic yet do have high fungicidal activity. In certain formulations and applications, $n$ and $n'$ in the foregoing description of novel compounds of this invention may be more broadly defined as being numbers less than 6.0 or as numbers from 1 to 5, inclusive.

It will be understood, of course, that compounds of the present invention may be employed in a variety of compositions for use in fungicidal and other applications and that the nature of these compositions will depend to a large degree upon the particular application contemplated. For example, they may be utilized in any conventional manner either via foliage treatment or soil applications by spraying, drenching, dusting, and the like. In addition, compounds of this invention may be embodied in dusting compounds containing carriers or fillers, such as talc, diatomaceous earth, pyrophyllite, or other inorganic or organic materials. Similarly, if a liquid drench or spray material is desired, a compound of the invention may be formulated in a liquid material, such as a hydrocarbon oil, acetone, water, and/or various other solvents, diluents, extenders, and the like. Liquid compositions may also contain quantities of wetting agents, such as alkyl aryl sulfonates, alkyl aryl polyether alcohols, fatty acid esters, and the like. Further, in certain instances the compounds of this invention may be combined with various other plant-treating materials, such as insecticides, miticides, defoliants, and the like, or various compounds of the present invention may be combined to form a single plant-treating material.

Compounds of the present invention generally may be prepared by condensing halogenated aromatic compounds, e.g., a chlorinated benzene, with carbonyl chloride to form a halogenated benzophenone. This product may then be treated with hydroxyl amine to form the desired oxime. An alternative method, particularly useful when it is desired to form unsymmetrical compounds within the scope of this invention, includes first reacting a halogenated aromatic compound with carbonyl chloride and then reacting the resultant halogenated benzoyl chloride with a second halogenated aromatic compound, which may contain the same or different numbers and types of halogen atoms, to obtain an unsymmetrical halogenated benzophenone. This intermediate unsymmetrical halogenated benzophenone may then be treated with hydroxyl amine to form the corresponding oxime.

In order that those skilled in the art may more completely understand the present invention and the preferred methods by which the same may be carried into effect, the following specific examples are offered:

EXAMPLE I

Part A

Into a 3-necked flask equipped with a thermometer, agitator, and reflux condenser are introduced 46.5 gms. of 2,4,5,2',4',5'-hexachlorobenzophenone, 10.8 gms. of hydroxyl amine hydrochloride, and 75 ml. of pyridine (98%). The resultant mixture is heated with agitation while 75 ml. of isopropyl alcohol is added. The solution obtained is refluxed at a temperature between 93° and 95° C. for 4 hours. The reaction mixture is then stirred into cold water, whereupon a yellow mass separates. This crude product, which is useful in certain applications without further purification, is solidified, washed with water, and dried.

Part B

The product of Part A is dissolved in 500 ml. of boiling isopropyl alcohol containing activated charcoal. The solution is cooled and unreacted hexachlorobenzophenone, which separates, is removed by filtration. The filtrate containing the 2,4,5,2',4',5'-hexachlorobenzophenone oxime is diluted with 100 ml. of 45% aqueous isopropyl alcohol, is concentrated by heating, and thereafter cooled to obtain the oxime, which is removed by filtration. The filtrate concentration and cooling is repeated to obtain a second crop of oxime crystals. The two crystal crops are combined, dissolved in hot heptane, and recrystallized by cooling. The crystals are then washed with cold heptane and dried. The total yield of purified 2,4,5,2',4',5'-hexachlorobenzophenone oxime is 30.5 gms. Analysis of the purified $C_{13}H_5Cl_6NO$, which has a melting point of 134.5–135.5° C., gives the following results:

| Element | Percent Calculated | Percent Actual |
| --- | --- | --- |
| Carbon | 38.7 | 38.7 |
| Hydrogen | 1.25 | 1.30 |
| Chlorine | 52.7 | 53.1 |
| Nitrogen | 3.47 | 3.57 |

EXAMPLE II

To illustrate the fungicidal effectiveness of compounds of the present invention, 2,4,5,2',4',5'-hexachlorobenzophenone oxime is applied in a slide germination test to spores of *Alternaria oleracea* and *Sclerotinia fructicola*. On the basis of such tests, the compound inhibited at least half the fungus spores treated in an amount of 1 to 10 parts per million.

EXAMPLE III 2,4,5,2',4',5'-hexachlorobenzophenone oxime is sprayed as an acetone emulsion, containing Triton X-155 (alkyl aryl polyether alcohol), on 25-day-old tomato plants (var. Bonny Best) afflicted with early blight (*Alternaria solani*). Using concentrations in parts per million of 400, 80, and 16, the inhibition of the blight by the fungicide is 87%, 85%, and 73%, respectively, thus indicating high fungicidal activity.

EXAMPLE IV

Part A

To illustrate the absence of phytotoxicity in compounds of the invention, plants are treated with 2,4,5,2',4',5'-hexachlorobenzophenone oxime by application to the soil in amount of 250 mg. per 4½" diameter clay pot on tomato plants (var. Bonny Best), corn (var. Early Golden Orange Dent), beans (var. Tender Green), and squash (var. Golden Summer Crookneck). No plant injury or other phytotoxic effect is observed.

Part B

Further phytotoxicity tests are conducted by spraying 2,4,5,2',4',5'-hexachlorobenzophenone oxime on foliage at a concentration of 2000 parts per million for 30 seconds at 40 pounds pressure on 25-day-old tomato plants and 25-day-old cucumber plants. No plant injury or other phytotoxic effects are observed.

From the foregoing examples it will now be seen that compounds within the scope of the invention are particularly useful in fungicidal applications. It has been found that such compounds may be used alone or in various compositions, including dusting compositions comprising a compound embodying the present invention and a carrier material, and in plant-treating compositions comprising a sprayable liquid including a compound of this invention as an active ingredient thereof.

While the compounds of this invention have been described as being useful in fungicidal applications with respect to plant life, it should be understood that their use in other fungicidal applications is also contemplated. Further, in referring to the use of compounds of this invention as fungicides, it is intended to use the term "fungicide" to include both those applications wherein fungi are actually destroyed and also those instances where the germination of fungus spores is inhibited. It will be appreciated, of course, by those skilled in the art that the myriad varieties and types of fungi falling within the broad classification of Thallophyta and the four major subclasses of Phycomycetes, Ascomycetes, Basidomycetes, and *Fungi imperfecto* preclude any detailed disclosure as to a preferred formulation for killing a particular type of fungus.

It is to be understood that although the invention has been described with specific reference to particular embodiments thereof, it is not to be so limited, since changes and alterations therein may be made which are within the full intended scope of this invention as defined by the appended claims.

What is claimed is:

1. The process of destroying fungal plant pests, said process comprising applying to said plants a compound having the formula

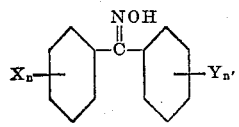

wherein X and Y are halogen atoms, and $n$ and $n'$ represent numbers within the range of 2 to 5, inclusive.

2. A process of destroying fungal plant pests, said process comprising applying to said plants a compound having the formula

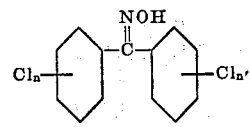

wherein $n$ and $n'$ represent numbers within the range of 2 to 5, inclusive.

3. A fungicidal composition comprising a compound having the formula

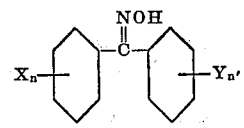

wherein X and Y are halogen atoms, and $n$ and $n'$ represent numbers within the range of 2 to 5, and an inert fungicidal adjuvant therefor.

4. A composition of matter comprising a compound having the formula

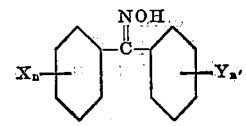

wherein X and Y are halogen atoms, and $n$ and $n'$ represent numbers within the range of 2 to 5, inclusive, and an inert fungicidal liquid adjuvant therefor.

5. A dusting composition comprising as an active essential ingredient the compound

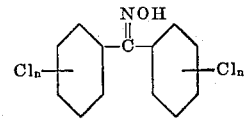

wherein X and Y are halogen atoms, and $n$ and $n'$ represent numbers within the range of 2 to 5, inclusive, and an inert powdered carrier material.

6. A fungicidal composition comprising as the active fungicidal ingredient

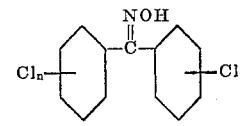

wherein $n$ and $n'$ represent numbers within the range of 2 to 5, inclusive, said compound being dispersed in a sprayable liquid selected from the group consisting of water, and a solvent for said compound.

7. A composition as in claim 6 in which there is present a wetting agent.

References Cited in the file of this patent

Wilson: J. Org. Chem., vol 5 (1940), pp. 222-226.
March et al.: Jour of Economic Entomology, vol 45 (1952), pp. 851-860.
Beilstein, Vierte Auflage, vol 7, pp. 420-421 (1943).